United States Patent [19]

MacArthur et al.

[11] Patent Number: 5,184,019
[45] Date of Patent: Feb. 2, 1993

[54] LONG RANGE ALPHA PARTICLE DETECTOR

[75] Inventors: Duncan W. MacArthur; Michael A. Wolf; James L. McAtee; Wesley P. Unruh; Alfred L. Cucchiara; Roger L. Huchton, all of Los Alamos, N. Mex.

[73] Assignee: The United States of America as represented by the United States Department of Energy, Washington, D.C.

[21] Appl. No.: 709,566

[22] Filed: Jun. 3, 1991

Related U.S. Application Data

[63] Continuation-in-part of Ser. No. 494,286, Mar. 16, 1990, abandoned.

[51] Int. Cl.⁵ .............................................. H01J 47/02
[52] U.S. Cl. ...................................... 250/380; 250/384
[58] Field of Search ......................... 250/374, 380, 384

[56] References Cited

U.S. PATENT DOCUMENTS

| | | | |
|---|---|---|---|
| 2,499,830 | 3/1950 | Molloy | 250/374 |
| 4,441,024 | 4/1984 | Anderson | 250/380 |
| 4,445,037 | 4/1984 | Anderson | 250/380 |
| 4,451,736 | 5/1984 | Cameron | 250/336.1 |
| 4,853,536 | 8/1989 | Dempsey et al. | 250/336.1 |

*Primary Examiner*—Carolyn E. Fields
*Assistant Examiner*—Drew A. Dunn
*Attorney, Agent, or Firm*—Milton D. Wyrick; Paul D. Gaetjens; William R. Moser

[57] ABSTRACT

An alpha particle detector capable of detecting alpha radiation from distant sources. In one embodiment, a high voltage is generated in a first electrically conductive mesh while a fan draws air containing air molecules ionized by alpha particles through an air passage and across a second electrically conductive mesh. The current in the second electrically conductive mesh can be detected and used for measurement or alarm. The detector can be used for area, personnel and equipment monitoring.

18 Claims, 8 Drawing Sheets

LONG RANGE ALPHA PARTICLE DETECTOR

The present invention relates to the field of detection of radiation and, more specifically to the detection of alpha particles at a relatively great distance from the point of emission of the alpha particle. The invention is a result of a contract with the Department of Energy (Contract No. W-7405-ENG-36).

This is a continuation-in-part application out of U.S. patent application Ser. No. 494,286, entitled "LONG RANGE ALPHA PARTICLE DETECTOR," now abandoned.

In any area where radioactive materials are handled, it is imperative, both for the protection of personnel and to avoid contamination of the environment, to continuously monitor personnel, equipment, and clothing to prevent the release of radioactive contamination. Alpha contaminants, such as plutonium, are particularly difficult to detect because of the limited penetration of alpha particles in air. Alpha particles from typical contaminants travel no more than two inches in air. It is because of this characteristic that prior alpha detectors have been useful only when used in close proximity to the point of possible emission. Currently, alpha contamination cannot be detected if it originates in a space that is too small for insertion of a conventional monitor. Prior detectors have normally been employed in personnel screening when moved slowly in close proximity to a person's body. Workers in nuclear processing facilities must place their hands and feet on sensors when moving from room to room. All of this can slow operations, as it is not currently possible to adequately screen personnel within a reasonable period of time.

It is also extremely difficult to monitor equipment for alpha contamination, again due to the limited range of alpha particles in air. Because of the monitoring difficulty, equipment that has been used in a potentially contaminated area is often classified as potentially contaminated and its further use is restricted to other controlled areas. If such equipment could be effectively monitored for contamination, the equipment could be released for use in uncontrolled areas. Previously, contamination inside assemblies has been impossible to detect without dismantling the assembly. The present invention allows contamination detection in any area that air can penetrate.

As used herein, the terms "long range," or "long distance," when referring to the detection capabilities of the present invention, shall mean detection from a range or distance of more than two (2) inches from the source of alpha radiation.

In the past, several instrument designs have been utilized to detect alpha radiation. Among these are GM tubes, ionization chambers, count rate detectors, and scintillation or gas flow proportional probes. While these instruments are capable of detecting alpha particles, they do so by directly detecting incident radiation, and must be within an inch of the source of the radiation. Additionally, these conventional alpha particle detectors can only scan an area the size of the detector.

The primary reason for an alpha particle's short flight path in air is its collision with air molecules. In almost all of these collisions, air ions are created which will have a longer life and area of influence than the alpha particles that created them. It is these ions that are detected by the present invention. The fact that the air ions have a longer range than the alpha particles relieves the necessity for having a detector moved over a person or equipment in order to detect the presence of alpha radiation.

It is therefore an object of the present invention to provide apparatus for the long range detection of alpha radiation.

It is a further object of the present invention to provide apparatus for detection of alpha particle contamination on large surfaces.

It is a still further object of the present invention to provide apparatus for more rapid screening of personnel for radiation contamination than is possible with current alpha monitors.

It is another object of the present invention to provide apparatus for the long range detection of alpha radiation which has superior sensitivity capable of satisfying the requirements of contamination regulations.

It is yet another of the present invention to provide apparatus for the long range detection of alpha radiation which insures adequate monitoring of convoluted surfaces that are not monitorable using traditional alpha particle scanning techniques.

SUMMARY OF THE INVENTION

To achieve the foregoing and other objects, and in accordance with the purposes of the present invention, as embodied and broadly described herein, the apparatus of this invention may comprise an electrically conductive enclosure defining first and second openings for admitting and exhausting air, with two or more electrical conductors insulatively mounted inside the enclosure. Voltage generating means are attached to one of the electrical conductors, to create an electric field between the two or more electrical conductors. Fan means are mounted outside the enclosure and adjacent to the second opening for drawing air containing the air ions through the first opening in the enclosure and across the electric field between the one or more electrical conductors. And detecting means are connected to another one of the two or more electrical conductors for indicating a current through the other one of the two or more electrical conductors produced by the air ions.

In a further aspect of the present invention, and in accordance with its objects and purposes, a method of detecting a distant source of alpha particles comprises the steps of generating a high voltage in a first electrical conductor; drawing air containing air ions through an air passage and across a second electrical conductor positioned between the first electrical conductor and the air passage; and detecting a current in the second electrical conductor produced by the air ions contacting the second electrical conductor.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE PREFERRED EMBODIMENTS

Figure 1:
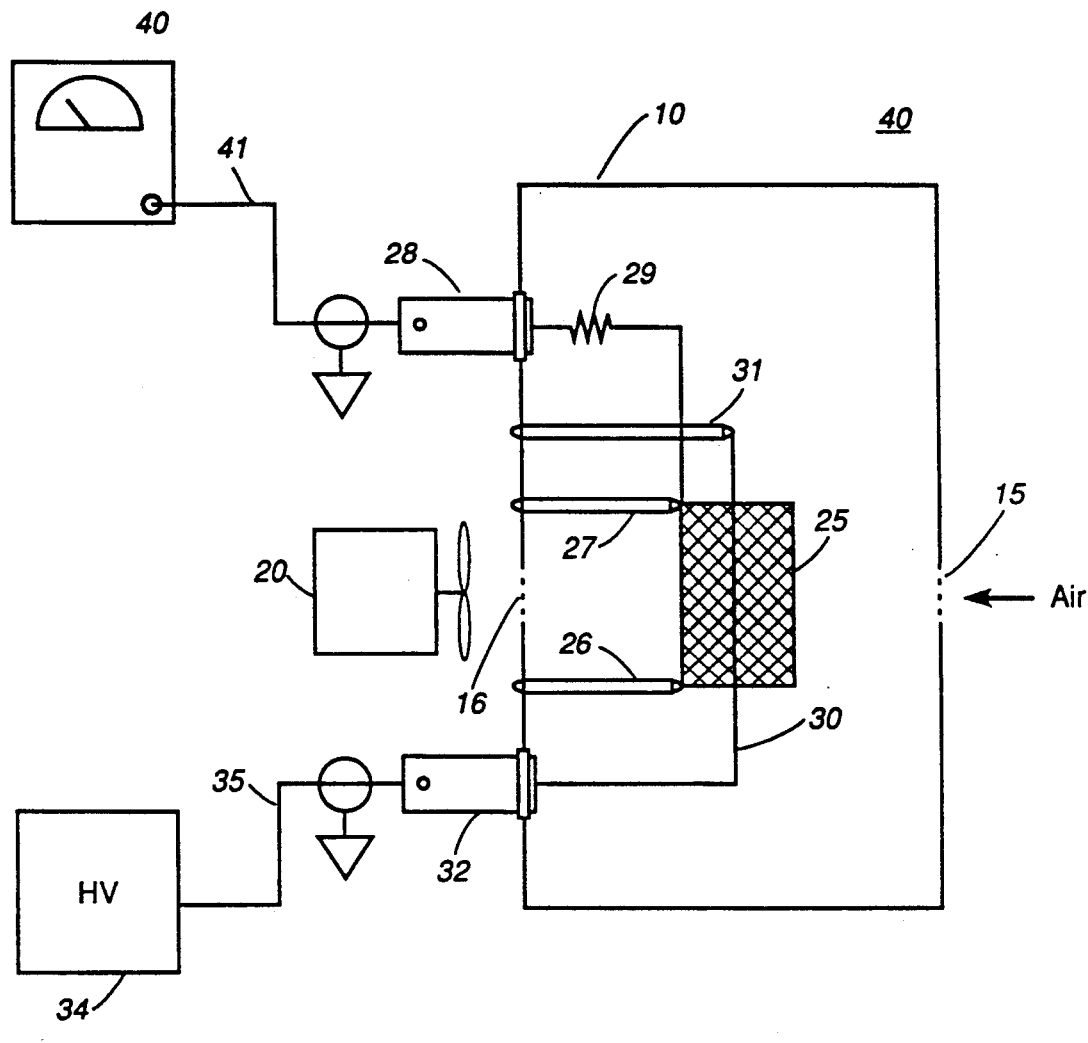
FIG. 1 is a partial schematic diagram of one embodiment of the present invention in which a conductor is placed inside a cylindrical mesh.

The present invention is most easily understood by reference to FIG. 1, wherein a partial schematic of one embodiment of the present invention is illustrated and in general denoted as detector 40. Enclosure 10, which is electrically conductive for shielding, is shown in cross-section so that its interior components may be more clearly illustrated. As seen, enclosure 10 has openings 15, 16 defined in two of its sides for the ingress and egress of air. Air is drawn through openings 15, 16 by fan 20. Openings 15, 16 may be covered with a conductive screen material to provide shielding and to prevent large particles from entering enclosure 10.

Electrically conductive mesh 25, in this embodiment, is formed into a cylindrical shape, and is securely but insulatively mounted to enclosure 10 with non-conductive stand-offs 26, 27, which may comprise TEFLON. Mesh 25, which may be made of brass wires, is connected through resistance 29 to BNC connector 28. Resistance 29 may have a value of approximately 300 MΩ. Detector 40, which is illustrated as a micro ammeter, can be any instrument, or group of instruments, sensitive to low current flow and capable of rendering a visual or audible alarm, is connected to BNC connector 28 through coaxial cable 41.

High voltage power supply 34, which should be capable of producing an output of at least 2 kilovolts, is connected to BNC connector 32 through coaxial cable 35. The high voltage is connected inside enclosure 10 from BNC connector 32 to conductor 30 which passes through mesh 25, and is supported by insulative stand-off 31 in an ion trap configuration. Stand-off 31 may also be made of TEFLON. Conductor 30 may conveniently comprise a brass rod, having a diameter of approximately 0.062 in.

In operation, fan 20 draws air into enclosure 10 through openings 15, 16 and across mesh 25. Fan 20 may be of any appropriate design as long as it has a capacity sufficient to draw air from a region of interest to conductive mesh 25 within about 1 second. Any positive ions created by collisions of air molecules with alpha particles will be attracted to mesh 25, producing a current through resistance 29 and coaxial cable 41. With mesh 25 being in a cylindrical shape, approximately 3 in long and having a diameter of 0.75 in, and a radioactive source (a 4,000 dpm Pu checksource) placed in front of opening 15, the approximate currents detected by a Keithly 610C electrometer as detector 40 are presented graphically in FIG. 4.

Figure 2:
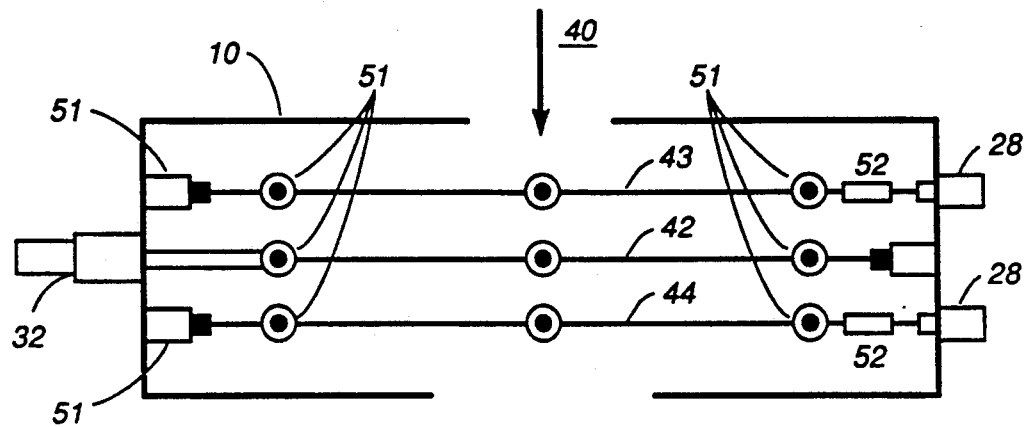
FIG. 2 is a cross-sectional top view of another embodiment of the present invention involving two electrically conductive grids for high voltage and signal gathering.
Figure 3:
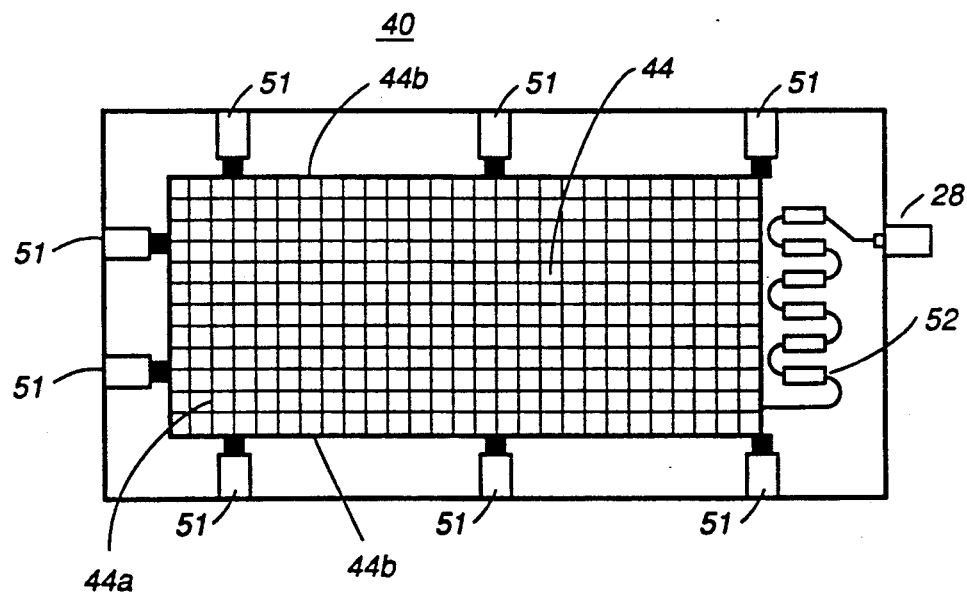
FIG. 3 is a schematic side view of the embodiment of the present invention illustrated in FIG. 2.

Another embodiment of detector 40 is illustrated in a cross-sectional top view in FIG. 2, and in side view in FIG. 3. In FIG. 2, it is shown that conductor 30 of Figure is replaced by high voltage (HV) grid 42 placed between signal grid 43 and signal grid 44. Signal grids 43, 44, and HV grid 42 are electrical conductors and are supported and isolated from enclosure 10 by non-conductive stand-offs 51. Each of signal grids 43, 44 is isolated from its output by resistance 52, which has a value of approximately 600 MΩ. Signal grids 43, 44, and HV grid 42 may be wire mesh stretched across a frame, as will be more clearly shown in FIG. 3.

This configuration was developed because, although the response of the embodiment illustrated in FIG. 1 was good, cylindrical detectors do not intercept all of the ions drawn into enclosure 10 (FIG. 1). Additionally, cylindrical detectors require a high operating voltage, and are not easily scalable to larger designs. As the electric field gradient immediately surrounding conductor 30 (FIG. 1) is relatively large, a large voltage must be applied to obtain a reasonable sweep voltage in the outer areas of conductive mesh 25 (FIG. 1). This relatively high voltage produces excess random noise.

Attention should now be directed to FIG. 3, a cross-sectional side view. As can be seen from the illustration of signal mesh 44, meshes 42a, 43a, and 44a of grids 42, 43, and 44 are relatively open, and are stretched across conductive frames 42b, 43b, and 44b. With signal grids 43, 44 connected in parallel, the source resistance, represented as resistance 52, is 300 MΩ, the same value as is useful in the prior embodiment.

As with the previous embodiment, limiting leakage current is of vital importance in this embodiment. Non-conductive stand-offs 51, which again may be made of Teflon, contribute greatly to the reduction of leakage current, as do resistance 52, and cleaning the entire enclosure 10 in an ultrasonic bath after final assembly. The most important noise reduction feature is that signal grids 43, 44 are mounted on standoffs 51 which are attached to enclosure 10 rather than to the voltage grid 42. This form of construction eliminated any leakage current flow between the signal and voltage grids. Even with these precautions, leakage noise still dominated ambient ion noise with this embodiment.

Figure 4:
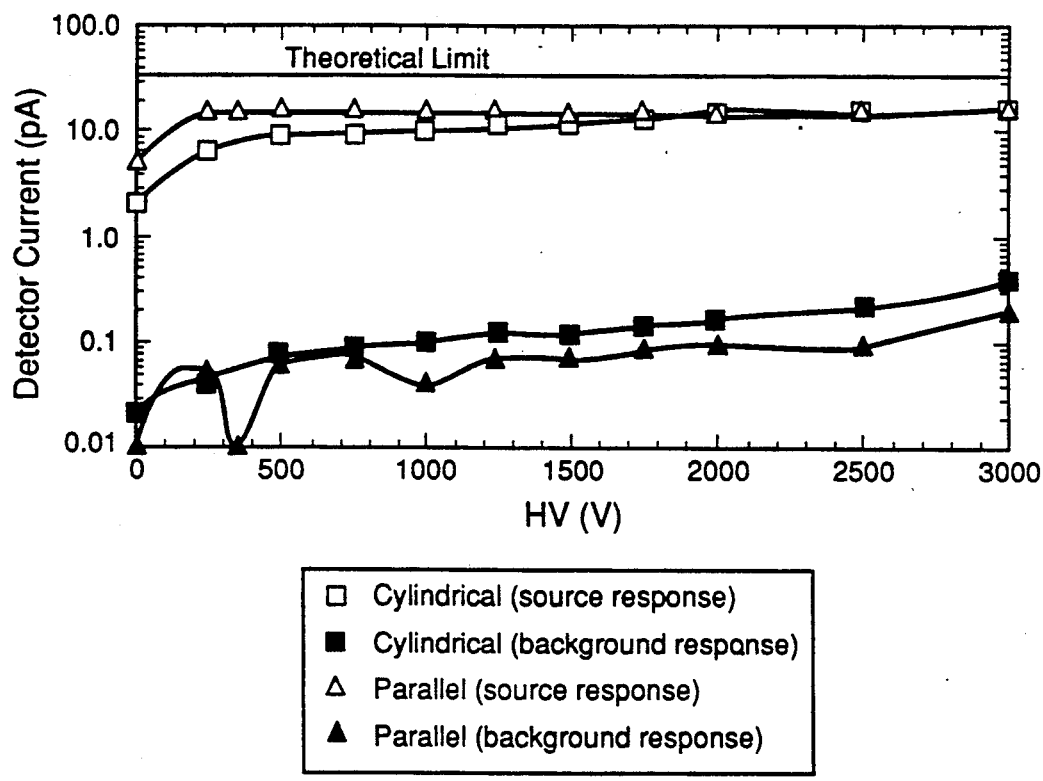
FIG. 4 is a graph of detector current versus high-voltage, comparing background response and source response for the two embodiments of the present invention.

FIG. 4 illustrates a graph of Detector Current (pA) versus HV in volts for the two embodiments of the present invention. The results for the first embodiment are represented by the squares, and the results for the present embodiment are represented by triangles. Also shown is a horizontal line at approximately 34 pA. This line represents the theoretical limit of detector current. The theoretical limit would only be achieved if all air ions in enclosure 10 were collected and detected by signal mesh 25 (FIG. 1) or by signal grids 43, 44 (FIG. 3).

The lower pair of curves show the background noise experienced with the two embodiments, and the upper pair of curves show the source response. As seen, both embodiments of the present invention closely approach the theoretical response limit. Although FIG. 4 illustrates that the two embodiments are generally comparable, it also shows that the present embodiment can achieve responses superior to the first embodiment at a much lower HV level. As seen in FIG. 4, this HV level is at approximately 350 V, a point of a greatly reduced noise level.

Conductive high voltage grid 42 and signal grids 43, 44 may be flat electrically conductive mesh screens as are illustrated in FIGS. 2 and 3. Testing has indicated that the entire detectable signal current has been contributed by signal grid 43 alone, and that the lowest background noise, as illustrated in FIG. 4, is attained with signal grid 44 grounded. This suggests that the use of signal grid 44 may not be necessary, although this has not been conclusively proven. It should be noted that with either embodiment, enclosure 10 is essentially the same, particularly regarding the openings.

Figure 5:
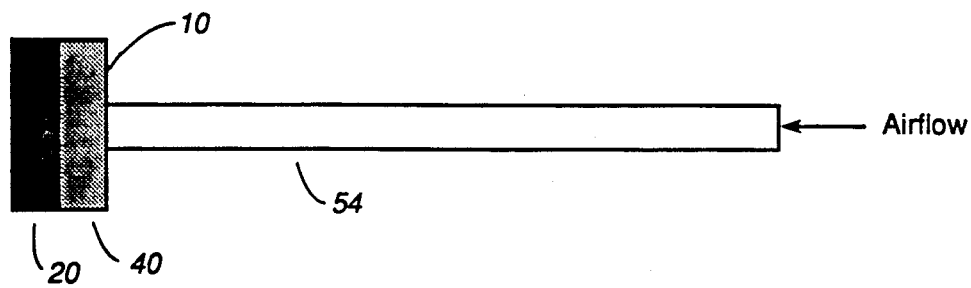
FIG. 5 is a perspective view of the embodiment of the present invention illustrated in FIGS. 2 and 3 and including a channel connecting it with a distant source of radiation.
Figure 6:
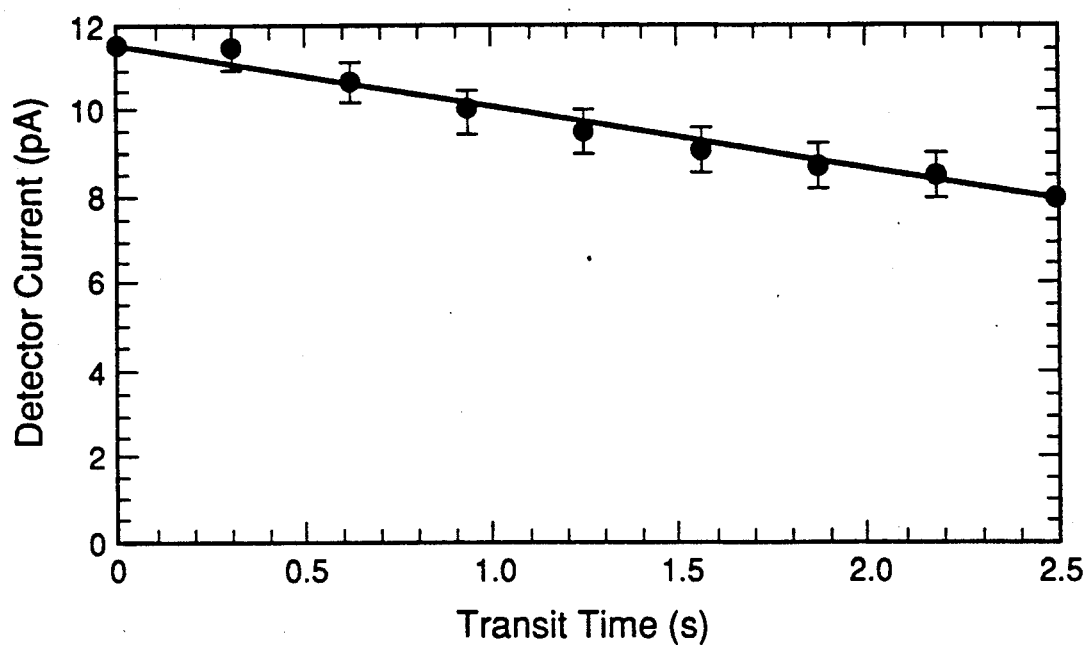
FIG. 6 is a graph of detector response versus ion lifetime for the embodiment of the invention illustrated in FIGS. 2 and 3.

In a further embodiment, illustrated in FIG. 5, an aluminum channel 54 is shown attached to enclosure 10, which may enclose components of the embodiments shown in either FIG. 1 or FIG. 2, with fan 20 attached. In one test, channel 54 was eight (8) feet long, and had a source of alpha radiation placed at its open end. FIG. 6 depicts the detector current versus transit time for this channel 54, and confirms that many air ions remain even after being transported through the entire 8 foot length of channel 54. This observed ion lifetime substantiates the long range detection capability of the present invention.

In the following embodiments, it is to be assumed that the detectors described contain one of the two embodiments of the present invention.

Figure 7:
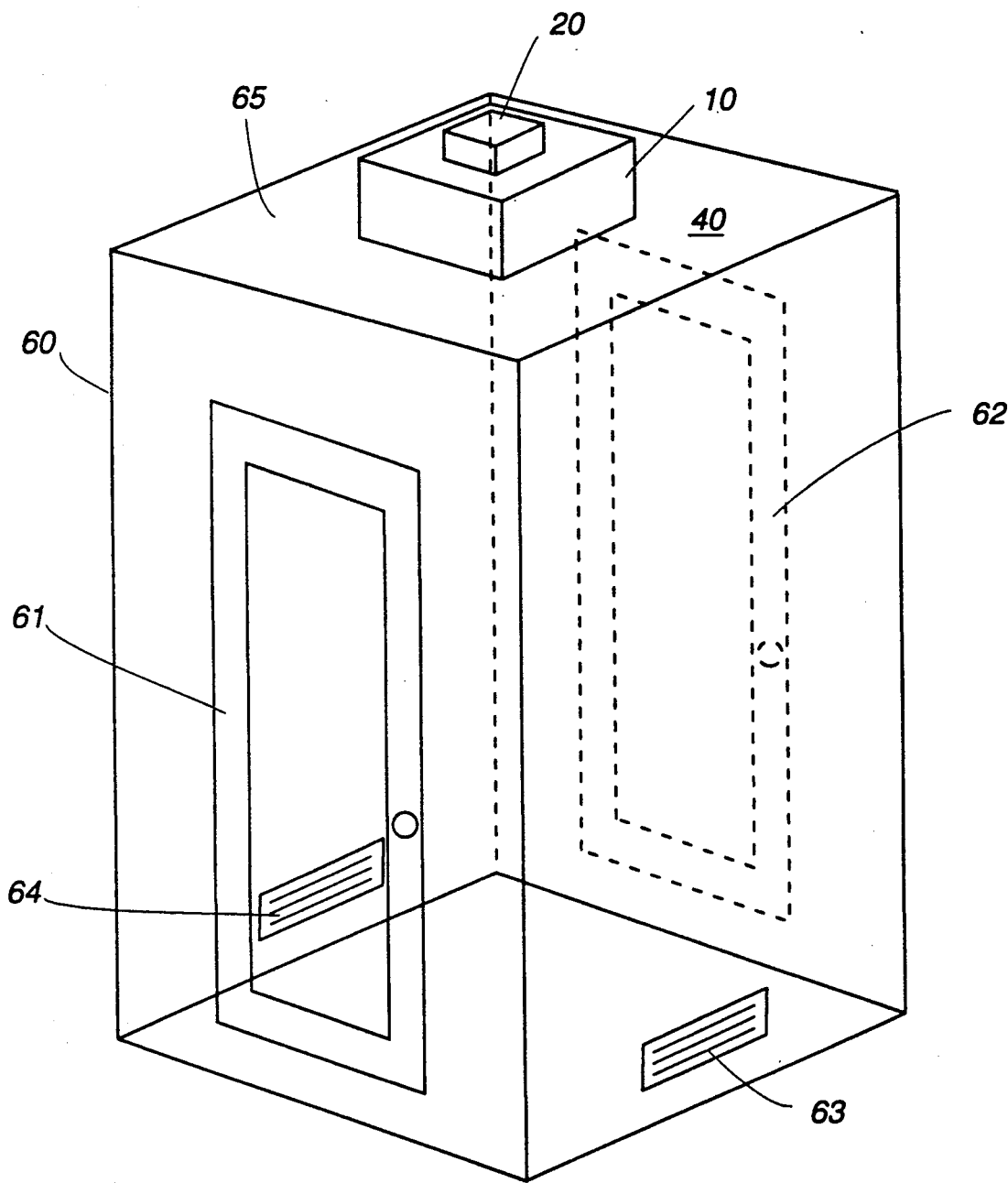
FIG. 7 is a perspective view of an embodiment of the present invention useful for efficient whole body screening of individuals entering or leaving work areas.

For use in personnel screening when entering or leaving a processing area, an embodiment similar to that illustrated in FIG. 7 could be employed. Referring to FIG. 7, there can be seen booth 60, with entry door 61 and exit door 62. Booth 60 would be constructed of a conductive material and would have air entry louvers 63, 64. Alpha detector 40, comprising enclosure 10 with fan 20 according to either embodiment of the present invention, but having greater air handling capacity than the embodiments illustrated in FIG. 1 and in FIG. 2, is mounted on booth ceiling 65, and its opening 15 would communicate with the interior of booth 60. Fan 20 would pull air into booth 60 through louvers 63, 64, over a person standing inside booth 60 (not shown), and across mesh 25 (FIG. 1) or conductive high voltage grid 42 and signal grids 43, 44 (FIG. 2). If desired, an interlock or alarm system could be employed to keep exit door 62 closed until a safe indication from alpha detector 40, resulting from no air ions being detected, is obtained.

Figure 8:
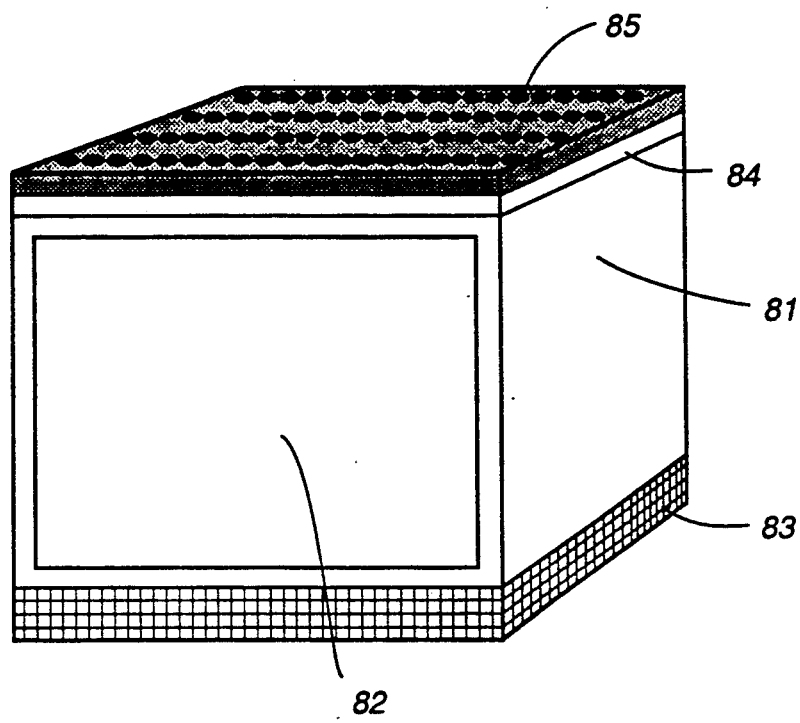
FIG. 8 is a perspective view of an embodiment of the present invention useful for monitoring anti-contamination garments.

For use in protective clothing monitoring, and embodiment such as is illustrated in FIG. 8 could be employed. Referring to FIG. 8, this embodiment consists of an enclosure 81, which is large enough to hold several items of adult clothing. The clothing is inserted through door 82 in enclosure 81. One or more fans 85 pull ambient air into enclosure 81 through air intake and filter 83, across the clothing and into alpha detector 84.

Any air ions generated by alpha decays on the clothing are detected in alpha detector 84.

Figure 9:
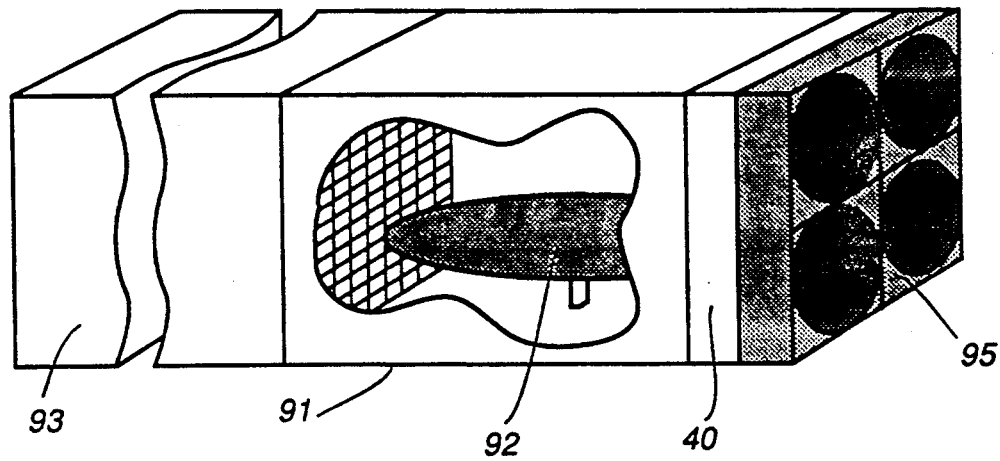
FIG. 9 is a perspective view of an embodiment of the present invention useful for monitoring items of equipment or tools. This embodiment, with the addition of arm-holes in one side, would also be useful for monitoring the hands and arms of radiation workers.

An embodiment for monitoring equipment or tools is illustrated in FIG. 9. This embodiment consists of an enclosure 91 containing a slowly rotating turntable 92. Ambient air is drawn by one or more fans 95 into enclosure 91 through air intake and filter 93, and through alpha detector 94. Turntable 92 may be required to present all surfaces of the scanned object equally to alpha detector. This embodiment may be easily modified for monitor the hands and arms of radiation workers by removing turntable 92 and cutting arm holes into enclosure 91. Any alpha generated air ions that are produced within enclosure 91 are detected in alpha detector 94.

Figure 10:
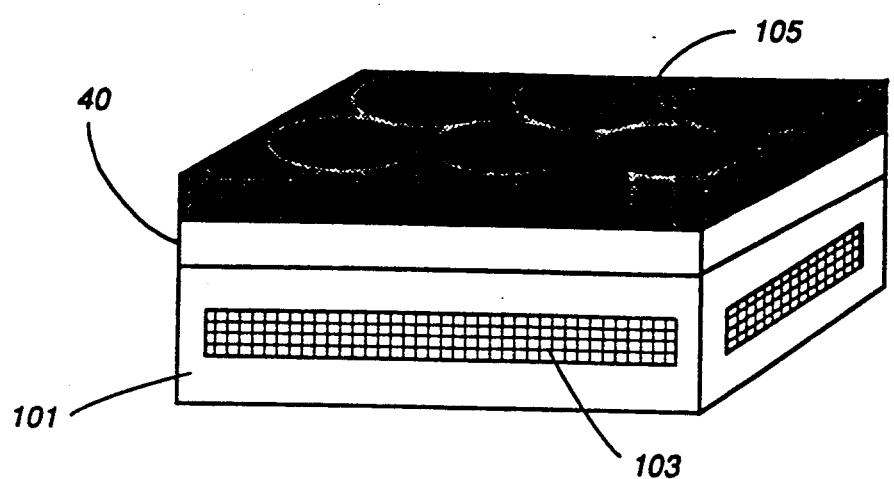
FIG. 10 is a perspective view of an embodiment of the present invention useful for monitoring soil samples or the soil surface.
Figure 11:
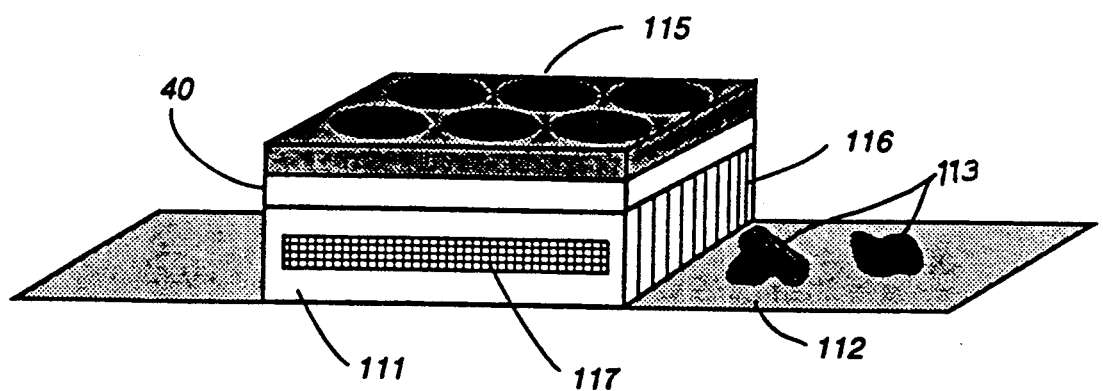
FIG. 11 is a perspective view of an embodiment of the present invention useful for monitoring potentially contaminated waste leaving nuclear facilities.

An embodiment such as is illustrated in FIG. 10 can be used for monitoring soil. Referring to FIG. 10, this embodiment consists of enclosure 101 with a soil sample (not shown) spread over the bottom of enclosure 101. Ambient air is drawn into enclosure 101 by one or more fans 105, through air intake and filter 103, through alpha detector 40. Alternatively, in situ soil can be monitored by removing the bottom of enclosure 101, and placing modified enclosure 101 directly on the soil surface to be monitored. Any alpha generated air ions produced by the soil are detected by alpha detector 40.

For use in radioactive waste minimization, the embodiment illustrated in Figure is useful. This embodiment consists of enclosure 111, which is similar to enclosure 101 (FIG. 10) of the previous embodiment, and conveyor belt 112 for transporting waste material 113. Waste material 113 enters enclosure 111 through curtain 116, which provides air isolation, while allowing waste material 113 to pass through. Curtain 116 may comprise overlapping flexible strips. One or more fans 115 draw ambient air into enclosure 111 through an air intake and filter 117. Any air ions generated by alpha decays in waste material 113 as it passes through enclosure 111 are detected by alpha detector 114.

Figure 12:
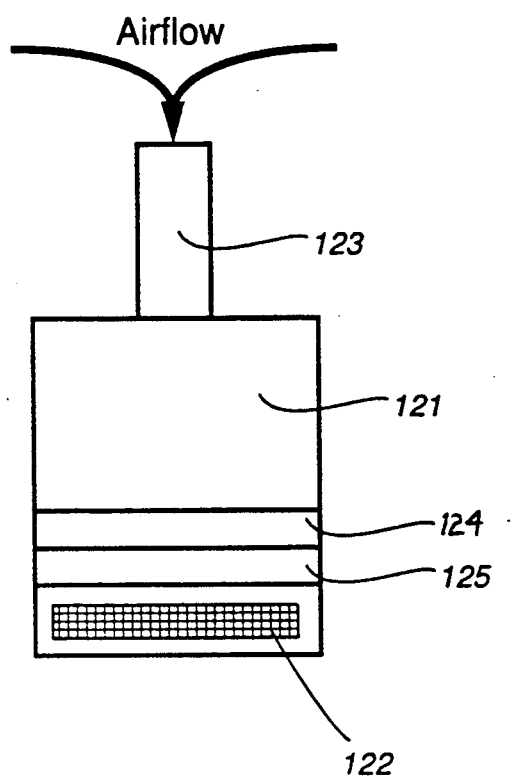
FIG. 12 is a plan view of an embodiment of the present invention useful for monitoring radon gas concentrations in buildings.

FIG. 12 illustrates an embodiment of the present invention which is useful for monitoring radon gas concentrations. As shown in FIG. 12, this embodiment comprises decay volume 121 instead of the enclosures of previous embodiments for allowing radon and daughter products in the air to decay. One or more fans 125 draw ambient air into decay volume through air intake and filter 123. In this embodiment, air intake and filter 123 contains an electrostatic filter for removing any ions that were generated outside decay volume 121. As radon and daughters decay in decay volume 121, air ions are generated which are detected by alpha detector 124. After passing through detector 124, the air is exhausted through vent 122.

In each of the preceding embodiments in which an air intake and filter is specified, the filter may comprise an electrostatic filter. Although a filter is not critical to the operation of the present invention, it is helpful when the invention is used in such situations as a smoky environment or when a thunderstorm is in the area. These types of conditions may themselves create air ions which could lead to false indications from the detector.

For nearby monitoring, as with hand held embodiments of the current invention, fan 20 (FIG. 1) could have a capacity of 5-10 cfm. For use with embodiments such as booth 60 (FIG. 7), where a greater capacity of air needs to drawn through enclosure 10, fan 20 should be capable of handling 100-500 cfm. The main requirement for fan 20 (or the multiple fans which may be used with some embodiments of the invention) is that it have sufficient capacity to draw air from the farthest point of interest through mesh 25 or through conductive high voltage grid 42 and signal grids 43, 44 within approximately 1 second. In all of the embodiments, it is important to remember that turbulence in the air should be avoided.

The foregoing description of embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An alpha particle detector that operates by detecting air ions created by collisions with alpha particles comprising:
   an electrically conductive enclosure defining first and second openings for admitting and exhausting air;
   two or more electrical conductors insulatively mounted inside said enclosure;
   means for generating a voltage in one of said electrical conductors, creating an electric field between said two or more electrical conductors;
   fan means mounted outside said enclosure adjacent to said second opening for drawing air containing said air ions through said first opening in said enclosure and across said electric field between said two or more electrical conductors; and
   detecting means connected to another one of said two or more electrical conductors for indicating a current through said another one of said two or more electrical conductors produced by said air ions.

2. The alpha particle detector as described in claim 1, wherein said two or more electrical conductors comprise two or more parallel planar electrically conductive meshes.

3. The alpha particle detector as described in claim 2, wherein said two or more planar electrically conductive meshes comprise first, second and third parallel planar electrically conductive meshes.

4. The alpha particle detector as described in claim 3, wherein said third electrically conductive mesh is grounded.

5. The alpha particle detector as described in claim 2, wherein said two or more planar parallel electrically conductive meshes comprise first and second parallel planar electrically conductive meshes.

6. The alpha particle detector as described in claim 5, wherein said first planar electrically conductive mesh is connected to said voltage generating means and said second planar electrically conductive mesh is connected to said detecting means.

7. The alpha particle detector as described in claim 1, wherein and two or more electrical conductors comprise first and second electrical conductors.

8. The detector as described in claim 1, further comprising channel means attached to said second opening for transporting air from a distant location to said detector.

9. The detector as described in claim 8, wherein said channel means comprises a conductive inner surface connected to said conductive enclosure.

10. The detector as described in claim 1, wherein said means for generating a voltage generates a voltage of at least 100 V in said one of said electrical conductors.

11. The alpha particle detector as described in claim 1, wherein said detector is mounted on an electrically conductive booth having ceiling, floor, sides, and first and second doors, and defining openings near said floor allowing air to enter said both.

12. The alpha particle detector as described in claim 11, wherein said second door is closed until allowed to be opened by said detecting means after no air ions are detected.

13. The alpha particle detector as described in claim 1, wherein said detector is mounted over an opening in an enclosure having air inlet vents.

14. The alpha particle detector as described in claim 13, wherein aid enclosure is mounted over a conveyor belt and wherein said conveyor belt comprises means for transporting tools, equipment, or radioactive waste through said enclosure.

15. The alpha particle detector as described in claim 1, wherein said detector is mounted over an opening in an enclosure having air inlet vents, or has an open bottom.

16. The alpha particle detector as described in claim 1, wherein said detector is mounted over an opening in an enclosure having air inlet vents, which enclosure has openings in a side sized for accepting hands and arms to be monitored for alpha contamination.

17. The alpha particle detector as described in claim 1, wherein said detector is mounted over an opening in an enclosure having air inlet vents and having a volume of sufficient size to constitute a decay volume, for monitoring radioactive gas concentrations.

18. A method of detecting a distant source of alpha particles comprising the steps of:
   generating a high voltage in a first electrical conductor;
   drawing air containing air ions through an air passage and across a second electrical conductor positioned between said first electrical conductor and said air passage; and
   detecting a current in said second electrical conductor produced by said air ions contacting said second electrical conductor.

* * * * *